(12) United States Patent
Kato et al.

(10) Patent No.: US 6,490,924 B2
(45) Date of Patent: Dec. 10, 2002

(54) ACTUATOR FOR OSCILLATOR

(75) Inventors: Manabu Kato, Aichi-ken (JP); Hideya Kurachi, Aichi-ken (JP)

(73) Assignee: Aisin Seiki Kabushiki Kaisha, Aichi-Ken (JP)

(*) Notice: Subject to any disclaimer, the term of this patent is extended or adjusted under 35 U.S.C. 154(b) by 1 day.

(21) Appl. No.: 09/809,289

(22) Filed: Mar. 16, 2001

(65) Prior Publication Data

US 2001/0022107 A1 Sep. 20, 2001

(30) Foreign Application Priority Data

Mar. 17, 2000 (JP) .................................. 2000-077091

(51) Int. Cl.⁷ .............................................. G01C 19/00
(52) U.S. Cl. ................................. 73/504.12; 73/504.14
(58) Field of Search ........................... 73/504.12, 504.02, 73/504.04, 504.14, 504.15, 504.16, 504.13, 514.32, 514.29

(56) References Cited

U.S. PATENT DOCUMENTS 5,635,638 A 6/1997 Geen 6,250,156 B1 * 6/2001 Seshia et al. ............ 73/504.12
6,267,008 B1 * 7/2001 Nagao ...................... 73/504.12

FOREIGN PATENT DOCUMENTS

| JP | 61105218 | 5/1986 |
| JP | H04-88809 | 8/1992 |
| JP | 2000028364 | 1/2000 |

OTHER PUBLICATIONS

WO 95/34798—Dec. 21, 1995.

* cited by examiner

Primary Examiner—Helen Kwok
(74) Attorney, Agent, or Firm—Sughrue Mion, PLLC

(57) ABSTRACT

An actuator for an oscillator which can control the fluctuation of the oscillation of an electrostatic driven oscillator such as the detection error by controlling the fluctuation of the amount of the noise mixed into a displacement detecting signal. An actuator oscillates a drive frame and a detecting frame in the X-direction by outputting the drive signal to a drive electrode to detect the displacement of the drive frame in the X-direction as a displacement detecting signal. The actuator generates a direct-current voltage component of the drive signal increased or decreased based on the detected displacement signal and the alternating voltage component of the drive signal having a constant amplitude to maintain the oscillation amplitude of the drive frame constant.

4 Claims, 13 Drawing Sheets

Electrode 13 Side

Electrode 66 Side

ACTUATOR FOR OSCILLATOR

This application is based on and claims priority under 35 U.S.C. § 119 with respect to Japanese Application No. 2000-077091 filed on Mar. 17, 2000, the entire content of which is incorporated herein by reference.

FIELD OF THE INVENTION

The present invention generally relates to an actuator for an oscillator. More particularly, the present invention pertains to an actuator for an oscillator for oscillating an electrostatic driven type oscillator provided with an angular rate sensor.

BACKGROUND OF THE INVENTION

A block diagram of a known actuator for an oscillator for oscillating electrostatic driven type oscillators provided with angular rate sensors is shown in FIG. 14. As shown in FIG. 14, a signals for the displacement of the electrostatic driven type oscillator caused by the oscillation in a driving direction is outputted from a driving direction displacement detecting electrode 81 to a displacement signal detecting portion 82.

The displacement signal outputted to the displacement signal detecting portion 82 is synchronously detected at a timing synchronized to the displacement in a driving direction in a synchronous detection circuit 83 to be outputted to an amplitude adjuster 84 as oscillation amplitude data.

Simultaneously, the displacement signal outputted to the displacement signal detecting portion 82 is outputted to the amplitude adjuster 84 after being phase-shifted by approximately 90 degrees in a 90 degree phase shifter 85. By means of the phase shift of the displacement signal by approximately 90 degrees via the 90 degree phase shifter 85, an alternating voltage component of the drive signal having phase-contrast by approximately 90 degrees relative to the displacement signal is generated in the amplitude adjuster 84 to facilitate the oscillation of the electrostatic driven type oscillator.

The oscillation amplitude data outputted to the amplitude adjuster 84 is compared with a predetermined amplitude value in the amplitude adjuster 84. When the oscillation amplitude data is smaller than the predetermined amplitude value, the alternating voltage component of the drive signal having increased amplitude is generated (incremental adjustment). On the other hand, when the oscillation amplitude data is larger than the predetermined amplitude value, the alternating voltage component of the drive signal having decreased amplitude is generated (decremental adjustment). The amplitude adjustment of the alternating voltage component of the drive signal in the foregoing manner is performed for controlling the amplitude driving force of the oscillator to have constant amplitude in the driving direction of the oscillator. The alternating voltage component of the drive signal of which the amplitude is adjusted in the foregoing manner is outputted to an adder 86.

In the adder 86, a drive signal is generated by incorporating the alternating voltage component of the drive signal of which the amplitude is adjusted and the direct-current voltage component (bias voltage) of the drive signal having a predetermined value. The drive signal generated in this manner is supplied to a drive electrode 87 fixed on a substrate. When the voltage of the drive electrode of the oscillator side is grounded (GND), the oscillator is oscillated to have constant amplitude in the driving direction by the oscillation of the electrostatic attraction (oscillation driving force) generated to be proportional to the second power of the drive signal (driving voltage) between the oscillator and the drive electrode 87.

Generally, electrostatic driven type oscillators are oscillated by a drive signal consisting of the alternating voltage component and the direct-current voltage component supplied thereto. The electrostatic driven oscillators are oscillated by the oscillation of the electrostatic attraction (oscillation driving force) generated proportional to the second power of the drive signal between the electrostatic driven type oscillator and a drive electrode. The displacement (oscillation amplitude) of the electrostatic driven type oscillator according to the oscillation in the driving direction is detected as the displacement signal. The generation of the drive signal is controlled by an amplitude adjusting means to maintain the constancy of the oscillation amplitude of the electrostatic driven type oscillator in the driving direction based on the detected displacement signal. By controlling the generation of the drive signal, the oscillation driving force (electrostatic attraction) of the electrostatic driven type oscillator is controlled to maintain the constancy of the oscillation amplitude of the electrostatic driven type oscillator in the driving direction.

The alternating voltage component of the drive signal is a cause of the noise of the displacement detecting signal because of the approximately same frequency with the displacement detecting signal. Thus, the alternating voltage component of the drive signal becomes a main cause of the detection error of the oscillation condition of the electrostatic driven type oscillator. When the angular rate is detected while the electrostatic driven type oscillator is oscillated, the alternating voltage component causes a lag of the detected output.

When the amount of the noise deriving from the alternating component of the drive signal is stable, the detection error of the oscillation and the lag of the detected output of the angular rate maintain an approximately fixed level. When the detection error of the oscillation and the lag of the detected output of the angular rate maintain an approximately fixed level, they can be easily corrected. Therefore, when the amount of the noise deriving from the alternating voltage component of the drive signal is stable, it is easy to correct the error. However, when the increase or decrease of the alternating voltage component of the drive signal is adjusted for maintaining the oscillation amplitude in the driving direction to be constant while the Q factor of the electrostatic driven type oscillator in the driving direction is fluctuated by the change of the electrostatic driven type oscillator due to the passage of time and the change of the environmental temperature, the amount of the noise mixed in the displacement detecting signal is fluctuated. Thus, the detecting error of the oscillation condition of the electrostatic driven type oscillator and the lag of the detected output of the angular rate are fluctuated by the increase or decrease of the alternating voltage component of the drive signal.

SUMMARY OF THE INVENTION

In light of the foregoing, it is an object of the present invention to provide an actuator for an oscillator preventing unfavorable conditions such as the change of the detection error and the fluctuation of the lag of the detecting output of the angular rate of the oscillation of the electrostatic driven type oscillator by controlling the fluctuation of the amount of the noise mixed in the displacement signal.

It is a further object of the present invention to provide an actuator for oscillators minimizing the fluctuation of the alternating voltage component of the drive signal.

To attain the above objects, the following technical means are provided with the actuator for the oscillator of the present invention which includes an electrostatic driven type oscillator, an oscillator driving means for oscillating the electrostatic driven type oscillator by outputting a drive signal thereto, a displacement detecting means for detecting the displacement based on the oscillation of the electrostatic driven type oscillator as a displacement signal, and an amplitude adjusting means for controlling the generation of the drive signal outputted from the oscillator driving means to maintain the constancy of the oscillation amplitude of the electrostatic driven type oscillator based on the detected displacement signal. The amplitude adjusting means includes an alternating voltage component generating means for generating an alternating voltage component of the drive signal having a constant amplitude or an amplitude proportional to the oscillation amplitude and a direct-current voltage component generating means for generating the direct current of the drive signal controlled to be increased or decreased based on the detected displacement signal. Based on the drive signal consisting of the alternating voltage component and the direct-current voltage component, the oscillation driving force of the electrostatic driven type oscillator is controlled to maintain the constancy of the oscillation amplitude of the electrostatic driven type oscillator.

According to the foregoing technical means, the amplitude adjusting means generates an incorporated drive signal consisting of the alternating voltage component or the alternating voltage component proportional to the oscillation amplitude maintaining a constant amplitude by the alternating voltage component generating means and the direct component generating means and the direct-current voltage component of which increase or decrease is controlled based on the detected displacement signal. Based on the drive signal, the oscillation driving force (electrostatic attraction) of the electrostatic driven type oscillator is controlled to maintain the constancy of the oscillation amplitude of the electrostatic driven type oscillator in the driving direction.

Thus, even when the Q factor of the electrostatic driven type oscillator in the driving direction is fluctuated due to the change of the electrostatic driven type oscillator by the passage of time and the change of the environment temperature, only the direct-current voltage component of the drive signal is increased and decreased to maintain the constancy of the alternating voltage component (amplitude). Accordingly, even when the Q factor of the electrostatic driven type oscillator in the driving direction is fluctuated due to the passage of time and the change of the environment temperature, the amount of the noise in the displacement signal deriving from the alternating voltage component of the drive signal is kept stable. This helps the correction of detection error changes as long as the noise amount is stable by keeping a fixed level.

Another aspect of the technical means of the actuator for the oscillator of the present invention involves the arrangement whereby the increase or decrease of the direct-current voltage component of the drive signal is controlled by one of three ways as follows. The increase or decrease of the direct-current voltage component of the drive signal is controlled to be proportional to the difference between the oscillation amplitude of the electrostatic driven type oscillator detected based on the displacement signal and a predetermined amplitude or is controlled to be proportional to a value obtained by performing time integration of the difference between the oscillation amplitude of the electrostatic driven type oscillator detected based on the displacement signal and the predetermined amplitude or is controlled to be proportional to an addition of the value obtained by performing time integration of the difference between the oscillation amplitude of the electrostatic driven type oscillator detected based on the displacement signal and the predetermined amplitude and the value proportional to the difference between the oscillation amplitude and the predetermined amplitude.

When the increase or decrease of the direct-current voltage component of the drive signal is controlled to be proportional to the difference between the oscillation amplitude of the electrostatic driven type oscillator detected based on the displacement signal and the predetermined amplitude, the lag of the control of the oscillation driving force of the electrostatic driven type oscillator is minimized to provide a control having a good response to the oscillation amplitude of the electrostatic driven type oscillator. When the direct-current voltage component of the drive signal is controlled to be proportional to the value obtained by performing time integration of the difference between the oscillation amplitude of the electrostatic driven type oscillator detected based on the displacement signal and the predetermined amplitude, the difference between the oscillation amplitude of the electrostatic driven type oscillator and the predetermined amplitude is controlled to be almost zero, which can provide a control with high accuracy to the oscillation amplitude of the electrostatic driven type oscillator. When the direct-current voltage component of the drive signal is controlled to be proportional to the addition of the value obtained by performing time integration of the difference between the oscillation amplitude of the electrostatic driven type oscillator detected based on the displacement signal and the predetermined amplitude and the value proportional to the difference between the oscillation amplitude and the predetermined amplitude, the lag of the control of the oscillation driving force of the electrostatic driven type oscillator is minimized and also the difference between the oscillation amplitude of the electrostatic driven type oscillator and the predetermined amplitude is controlled to be almost zero, which can provide a control with high response and high accuracy to the amplitude of the electrostatic driven type oscillator.

A further aspect of the technical means of the present invention involves the arrangement whereby the alternating voltage component of the drive signal is generated having a phase contrast by approximately 90 degrees to the displacement signal and having the amplitude of the alternating voltage component of the drive signal proportional to the amplitude of the displacement signal or is generated proportional to a signal obtained by performing one of the differentiation, the integration, or the 90 degree phase-shift to the displacement signal.

When the alternating voltage component of the drive signal is generated having a phase-contrast of 90 degrees to the displacement signal, the electrostatic driven type oscillator is oscillated at the most effective resonant point. When the amplitude of the alternating voltage component of the drive signal is generated proportional to the amplitude of the displacement signal, provided that the oscillation of the electrostatic driven type oscillator becomes stable, an alternating voltage component of the drive signal having a constant amplitude is generated. Thus, for instance, compared to the conventional method as shown in FIG. 14 which generates the alternating voltage component of the drive signal separately, the structure of the alternating voltage component generating means is simplified. Further, when the alternating voltage component of the drive signal is generated proportional to the signal obtained by performing the differentiation, the integration, or the phase-shift by 90 degrees to the displacement signal, provided that the oscillation of the electrostatic driven oscillator is stable, the alternating voltage component of the drive signal having a constant amplitude is generated only by damping or amplifying the signal obtained by performing the differentiation, the integration or the phase-shift by 90 degrees to the displacement signal based on the oscillation of the oscillator. Thus, for instance, the structure of the alternating voltage component generating means (circuit structure) is simplified compared to the conventional method as shown in FIG. 14 which generates the alternating voltage component of the drive signal separately. By performing the differentiation, the integration, or the phase-shift by 90 degrees to the displacement signal, the alternating voltage component of the drive signal having the phase-contrast by approximately 90 degrees to the displacement signal is generated. Accordingly, the electrostatic driven type oscillator is oscillated, at the most effective resonant point.

A still further aspect of the technical means of the present invention involves a first drive electrode and a second drive electrode having opposite electrostatic attraction directions, which is generated between the electrostatic driven type oscillator and the first and the second drive electrodes respectively. According to the foregoing technical means, the electrostatic driven type oscillator is oscillated by respective signals, each having an inverted alternating voltage component with respect to each other supplied to the first and the second drive electrodes in which the directions of the electrostatic attraction respectively generated between the electrostatic driven type oscillator are opposed to one another. In this case, the noise mixed with the displacement signal deriving from the alternating voltage component of each drive signal applied to the first and the second drive electrodes is offset. This reduces the total noise deriving from the alternating voltage component.

Furthermore, by providing a structure equalizing the electrostatic attraction of the first drive electrode and the second drive electrode generated between the electrostatic driven type oscillator by respective drive signals including an inverted alternating voltage component, the component of the force generated proportional to the second power of the direct-current voltage component and the component of the force generated proportional to the second power of the alternating voltage component in the oscillation driving force (electrostatic attraction) applied to the electrostatic driven type oscillator are offset from one another to reduce unnecessary motion.

BRIEF DESCRIPTION OF THE DRAWINGS

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

First Embodiment

Figure 1:
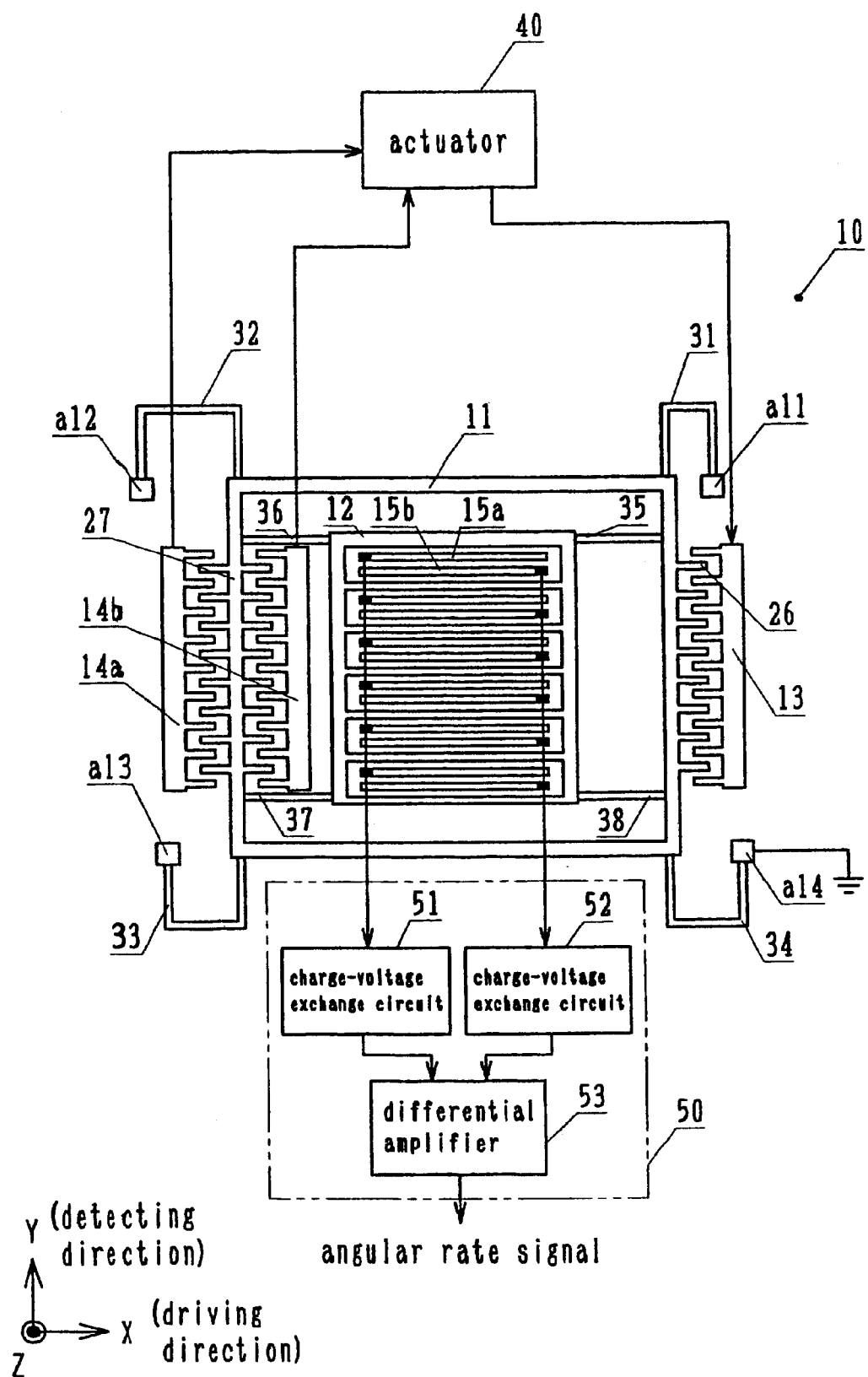
FIG. 1 is a schematic view of an angular rate sensor according to a first embodiment of the present invention.

Referring initially to FIG. 1, which illustrates an angular rate sensor provided with the actuator for an oscillator of the present invention, a silicon substrate 10 is provided with an insulating layer made, for example, from a silicon nitride membrane with a silicon oxidized membrane on the surface thereof. A drive frame 11 and a detecting frame 12 functioning as oscillators, a drive electrode 13, a first and a second driving direction displacement detecting electrodes 14a, 14b, first and second angular rate detecting electrodes 15a, 15b, and first, second, third, and fourth floating anchors a11, a12, a13, a14, all of which are provided on the substrate 10 and are formed from polysilicon with an added impurity to make the oscillator electrically conductive. The drive electrode 13, the driving direction displacement detecting electrodes 14a, 14b, the angular rate detecting electrodes 15a 15b, and the floating anchors a11 a14 are adhered to the silicon substrate 10.

An approximately rectangular-shaped drive frame 11 is provided with a tine-shaped drive side movable electrode 26 extending outwardly in the X-direction and tines thereof are arranged in parallel in the Y-direction on one side (right side of FIG. 1). A tine-shaped drive side detecting movable electrode 27 has tines extending in inner and outer X-directions with the tines thereof arranged in parallel in the Y-direction on the other side (left side of FIG. 1). The electrostatic attraction generated between the drive side movable electrode 26 and the drive electrode 13 is periodically fluctuated by the drive signal supplied to the drive electrode 13 to generate the oscillation of the drive frame 11. The drive side detecting movable electrode 27 detects the oscillation generated by the fluctuation of the electrostatic capacitance between the drive side detecting movable electrode 27 and the driving direction displacement detecting electrodes 14a, 14b caused by the oscillation of the drive frame 11. The isolation between the oscillator, each electrode, and a circuit is made by polysilicon wiring and an electrode pad formed on the silicon substrate 10 provided with the insulating layer on the surface thereof and having the same conductivity to the oscillator.

Four corners of the drive frame 11 is connected to the floating anchors a11 a14 via first, second, third, and fourth spring beams 31, 32, 33, 34 (made of conductive polysilicon) extended in the Y-direction to provide high flexure of the oscillator in the X-direction. The drive frame 11 and the spring beams 31 through 34 are formed to float over the silicon substrate 10, for instance, by the semiconductor processing by the lithography. The spring beams 31 through 34 each have the same width and length.

A detecting frame 12 having a shorter width and length compared to the drive frame 11 is formed in an approximately rectangular shape. The inside of the detecting frame 12 is equally divided into a plurality of six spaces by bridging beams which extend in the X-direction. The four corners of the detecting frame 12 are each connected to conductive polysilicon spring beams 35, 36, 37, 38 which extend in the X-direction and are each connected to the inside of the drive frame 11 to provide high flexure of the oscillator in the Y-direction upon flexure of the spring beams 35, 36, 37, 38. The detecting frame 12 and the spring beams 35 through 38 are formed to float on the silicon substrate 10, for example, by a semiconductor lithographic process. The spring beams 35 through 38 each have the same width and length.

Figure 2:
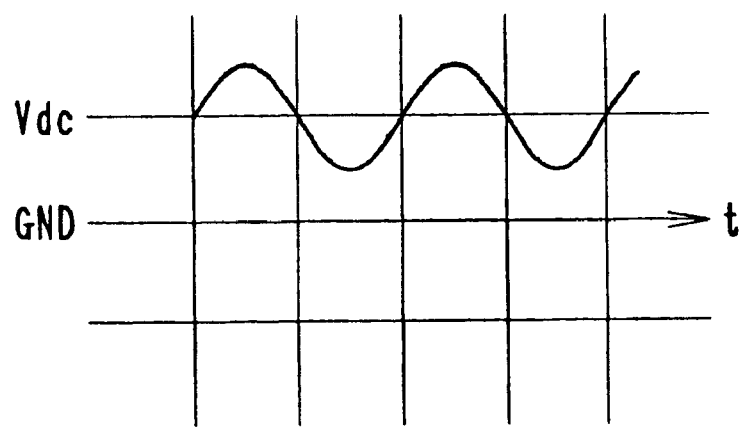
FIG. 2 is a time chart showing a drive signal supplied to a drive electrode of the first embodiment.

The drive electrode 13 is provided approximately along the Y-direction outside of the drive frame 11. The drive electrode 13 includes tine-shaped drive side fixed electrodes projecting in an interdigitated manner with the tines of the drive side movable electrode 26. The electrostatic capacitance between the drive electrode 13 and the drive side movable electrode 26 is periodically fluctuated by driving by a drive signal voltage comprised of the direct-current voltage component Vdc as a bias voltage and the alternating current (shown in FIG. 2) to oscillate the drive frame 11 in the X-direction. Since the detecting frame 12 is connected to the drive frame 11 via the spring beams 35 through 38 extending in the X-direction, the detecting frame 12 is oscillated the X-direction when the drive frame 11 is oscillated in the X-direction. The drive frame 11 and the detecting frame 12 are excited in the X-direction at a resonant frequency by the drive signal. When an angular component is provided around the Z-axis when the detecting frame 12 being is oscillated in the X-direction in association with the drive frame 11, the detecting frame 12 undergoes an elliptical motion having an oscillation component in the Y-direction by a Coriolis force generated by the angular rate.

The first and the second driving direction displacement detecting electrodes 14a, 14b are respectively provided inside and outside the drive frame 11 approximately in the Y-direction. Tine-shaped electrodes projecting from the electrodes 14a, 14b to mesh in an interdigitated manner with the tines of the drive side detecting movable electrode 27. The driving direction displacement detecting electrodes 14a, 14b detect the displacement of the drive frame 11 in the X-direction as a displacement signal. The displacement of the drive frame 11 in the X-direction is determined by the oscillation of the electrostatic capacitance generated between the driving direction displacement detecting electrodes 14a, 14b and the drive frame 11 based on the oscillation of the drive frame 11 in the X-direction. That is, when the drive frame 11 is moved to one side (right side of FIG. 1), the electrostatic capacitance between the driving direction displacement detecting electrode 14a and the drive side detecting movable electrode 27 is reduced and at the same time the electrostatic capacitance between the driving direction displacement electrode 14b and the drive side detecting movable electrode 27 is increased. On the other hand, when the drive frame 11 is moved to the other side (left side of FIG. 1), the electrostatic capacitance between the driving direction displacement detecting electrode 14a and the drive side detecting movable electrode 27 is increased and at the same time the electrostatic capacitance between the driving direction displacement detecting electrode 14b and the drive side detecting movable electrode 27 is reduced. Thus, the oscillation of the electrostatic capacitance (displacement signal) of the first and the second driving direction displacement detecting electrodes 14a, 14b is opposed to each other.

The angular rate detecting electrodes 15a, 15b are respectively provided in each space defined by the beams of the detecting frame 12. The angular rate detecting electrodes 15a, 15b detect the oscillation of the detecting frame 12 in the Y-direction by the oscillation of the electrostatic capacitance between the angular rate detecting electrodes 15a, 15b and the detecting frame 12 based on the oscillation of the detecting frame 12 in the Y-direction. That is, when the detecting frame 12 is moved upwardly in FIG. 1, the electrostatic capacitance between the detecting frame 12 and each angular rate detecting electrode 15a is reduced, and at the same time the electrostatic capacitance between the detecting frame 12 and each angular detecting electrode 15b is increased. On the other hand, when the detecting frame 12 is moved to the other side (bottom of FIG. 1), the electrostatic capacitance between the detecting frame 12 and each angular rate detecting electrode 15a is increased, and at the same time the electrostatic capacitance between the detecting frame 12 and each angular detecting electrode 15b is decreased. Accordingly, the oscillations of the electrostatic capacitance between the first and the second angular detecting electrodes 15a, 15b are opposed to each other.

The angular rate about the Z-axis is detected from the oscillation of the detecting frame 12 in the Y-direction when the detecting frame 12 is oscillated in the X-direction in association with the drive frame 11.

The electrical operation according to the angular rate detection of the angular rate sensor will be explained as follows. As shown in FIG. 1, the angular rate sensor includes an actuator 40 and a detector 50.

Figure 3:
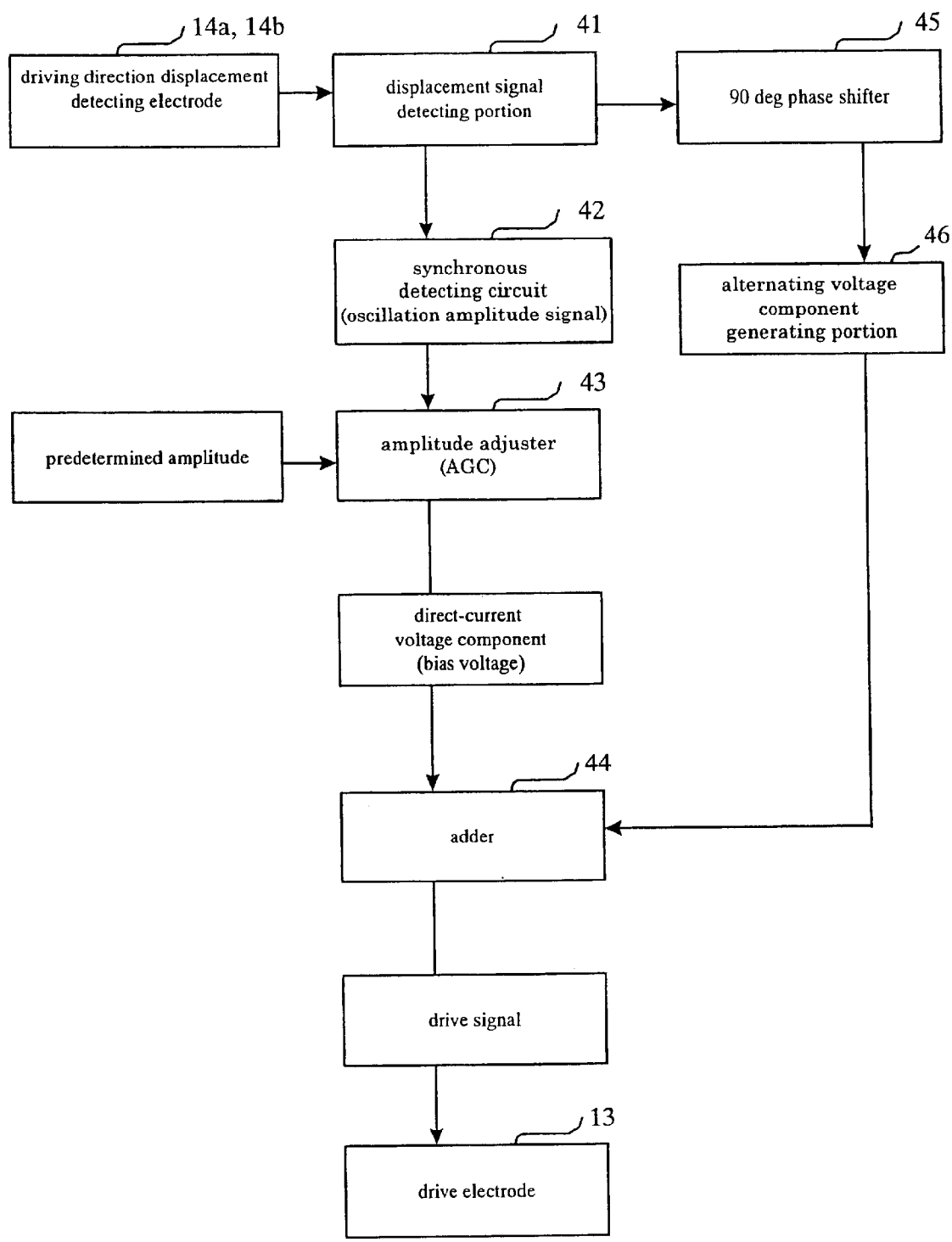
FIG. 3 is a schematic illustration of the angular rate sensor of the first embodiment.

The drive frame 11 and the detecting frame 12 are oscillated in the X-direction at resonant frequency by the actuator 40. The detailed structure of the actuator 40 is shown in FIG. 3. As shown in FIG. 3, each displacement signal from the driving direction displacement detecting electrodes 14a, 14b is outputted to a displacement signal detecting portion 41. Each displacement signal detected opposing each other is differentially amplified and a signal provided with the noise in phase based on the drive signal is generated in the displacement signal detecting portion 41.

Figure 4:
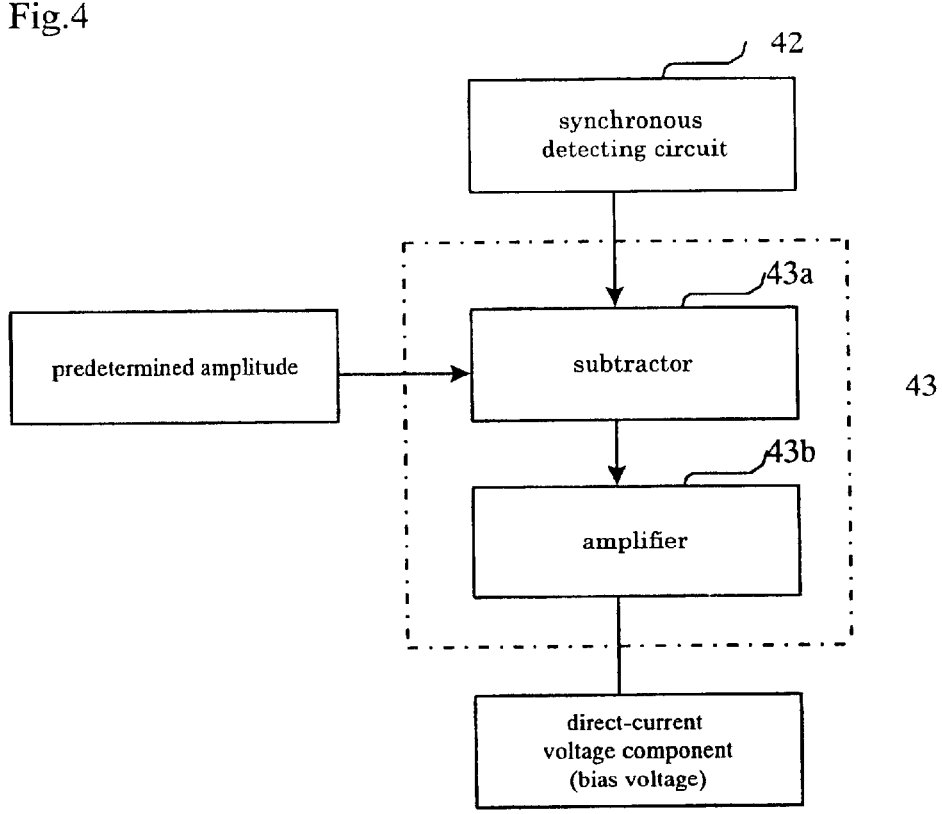
FIG. 4 is a schematic illustration of an amplitude adjuster of the first embodiment.

The displacement signal differentially amplified in the displacement signal detecting portion 41 is synchronously detected at a timing synchronized to the displacement in the X-direction in a synchronous detecting circuit 42 to be outputted as the oscillation amplitude data to an amplitude adjuster 43. As shown in FIG. 4, the amplitude adjuster 43 includes a subtracter 43a and an amplifier 43b. The difference between the oscillation amplitude data and a predetermined amplitude value outputted to the amplitude adjuster 43 is calculated in the subtracter 43a. In the amplifier 43b, a signal proportional to the difference between the oscillation amplitude data and the predetermined amplitude value is generated as the direct-current voltage component Vdc (bias voltage) of the drive signal. On one hand, the direct-current voltage component Vdc of the drive signal is generated to increase the potential (bias voltage) between the drive electrode 13 and the electrode 26 of drive frame 11 when the oscillation amplitude value is smaller than the predetermined amplitude value. On the other hand, the direct-current voltage component Vdc of the drive signal is generated to decrease the potential between the drive electrode 13 and the drive frame 11 when the oscillation amplitude value is larger than the predetermined amplitude value (decrement adjustment). The direct current Vdc of the drive signal is adjusted to control the oscillation drive force of the drive frame 11 and the detecting frame 12 to maintain the constancy of oscillation amplitude of the drive frame 11 and the detecting frame 12 in the X-direction. The current component Vdc of the drive signal generated in this manner is outputted to an adder 44. A displacement signal performed with time integration and synchronously detected at timing synchronized to the displacement speed in the X-direction may be outputted to the amplitude adjuster 43 as the oscillation amplitude data.

A part of the displacement signal differentially amplified in the displacement signal detecting portion 41 is outputted to an alternating voltage component generating portion 46 after being phase-shifted by approximately 90 degrees via a 90 degree phase shifter 45. In the alternating voltage component generating portion 46, the phase of the alternating voltage component having the same frequency as the displacement signal is shifted by approximately 90 degrees to the displacement signal to generate the alternating voltage component of the drive signal having the constant amplitude. The amplitude of the alternating voltage component of the drive signal is large enough to oscillate the drive frame 11 and the detecting frame 12 at the resonant frequency. By shifting the phase of the alternating voltage component of the drive signal by approximately 90 degree to the displacement signal, the drive frame 11 and the detecting frame 12 can be driven at the most effective resonant frequency point which makes the oscillation of the drive frame 11 and the detecting frame 12 easy. The alternating voltage component of the drive signal generated in the aforementioned manner is outputted to the adder 44.

In the adder 44, the adjusted direct-current voltage component Vdc of the drive signal and the alternating voltage component of the drive signal having the constant amplitude are added to generate an incorporated drive signal. The incorporated drive signal generated in the foregoing manner is supplied to the drive electrode 13. By the oscillation of the electrostatic attraction generated between the drive frame 11 and the drive electrode 13 proportional to the second power of the drive signal, the drive frame 11 is oscillated to maintain the constancy of the oscillation amplitude in the X-direction.

The detector 50 provided with first and second charge-voltage exchange circuits 51, 52 and a differential amplifier 53 detects the angular rate around the Z-axis. The first and the second charge-voltage exchange circuits 51, 52 are respectively connected to the angular rate detecting electrodes 15a, 15b to generate the electric signal corresponding to the oscillation of the electrostatic capacitance between the angular rate detecting electrodes 15a, 15b and the detecting frame 12 is at the GND level (a grounded detecting frame 12). The electric signal is the alternating signal showing the level shift which is synchronized to the oscillation of the detecting frame 12 in the Y-direction. Since the oscillations of the electrostatic capacitance of the angular rate detecting electrodes 15a, 15b are opposed to each other, the electric signals (voltage) generated in the first and the second charge-voltage exchange circuits 51, 52 are opposed to each other.

The differential amplifier 53 connected to the charge-voltage exchange circuits 51, 52 differentially amplifies the electric signals generated opposed to each other in each charge-voltage exchange circuits 51, 52 to generate the angular rate signal of which noise is offset.

As mentioned above, the detecting frame 12 is oscillated in the Y-direction by adding the angular rate around the Z-axis during the detecting frame 12 being oscillated in association with the drive frame 11. In this case, the angular rate signal based on the oscillation of the detecting frame 12 in Y-direction has a predetermined relationship with the added angular rate around the Z-axis. Accordingly, the added angular rate is detected from the angular rate signal.

According to the first embodiment, the drive signal including the direct-current voltage component Vdc is increased and decreased based on the detected displacement detecting signal and the alternating voltage component having the constant amplitude is generated. The oscillation driving force of the drive frame 11 and the detecting frame 12 is controlled based on the drive signal to maintain the constancy of the oscillation amplitude of the drive frame 11 and the detecting frame 12 in the X-direction.

Accordingly, even when the Q factor of the drive frame 11. and the detecting frame 12 in the X-direction is changed by the change of environmental temperature and the change of the drive frame 11 and the detecting frame 12 due to the passage of time, only the direct-current voltage component of the drive signal is controlled to be increased or decreased and the amplitude of the alternating voltage component is maintained to be constant. In consequence, even when the Q factor of the drive frame 11 and the detecting frame 12 in the X-direction is fluctuated by the change of the drive frame 11 and the detecting frame 12 due to the passage of time and the change of the environmental temperature, the amount of the noise mixed in the displacement detecting signal derived from the alternating voltage component of the drive signal is kept stable. This can control the fluctuation of the lag of the detected output of the angular rate and the detected error of the oscillation condition of the drive frame 11 and the detecting frame 12.

Another effect according to the first embodiment is as follows. In the first embodiment, the control for the increase and the decrease of the direct-current voltage component Vdc of the drive signal is conducted (the direct-current voltage component Vdc of the drive signal is increased and decreased) to be proportional to the difference between the oscillation amplitude data and the predetermined amplitude value of the drive frame 11 and the detecting frame 12 detected based on the displacement signal. Accordingly, the lag of the control for the oscillation driving force of the drive frame 11 and the detecting frame 12 can be minimized to provide a control with a good response to the drive frame 11 and the detecting frame 12.

Another effect according to the embodiment is as follows. In the first embodiment, the alternating voltage component of the drive signal is generated, after being added with the phase differences of 90 degrees. Accordingly, the drive frame 11 and the detecting frame 12 can be oscillated at the most effective resonant point.

Figure 5:
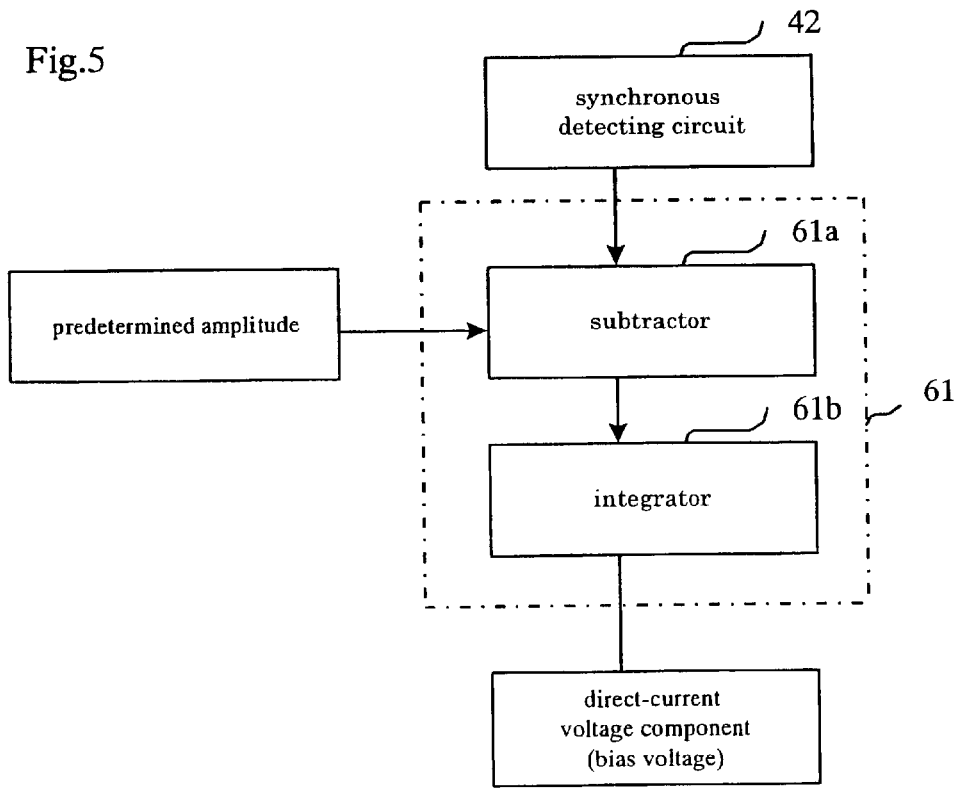
FIG. 5 is a schematic illustration of an example of another amplitude adjuster of the first embodiment.

Although the control of the increase and the decrease of the direct-current voltage component Vdc of the drive signal is conducted to be proportional to the difference between the oscillation amplitude data and the predetermined amplitude value of the drive frame 11 and the detecting frame 12 detected based on the displacement signal, other methods mentioned hereafter may be applied. The control of the increase and the decrease of the direct current Vdc of the drive signal may be conducted to be proportional to the value obtained by performing time integration of the difference between the oscillation amplitude data and the predetermined amplitude value of the drive frame 11 and the detecting frame 12 detected based on the displacement signal. That is, instead of using the amplitude adjuster 43 including the subtracter 43a and the amplifier 43b, an amplitude adjuster 61 including a subtracter 61a and an integrator 61b can be adopted as shown in FIG. 5. In this case, the difference between the oscillation amplitude data and the predetermined amplitude value outputted to the amplitude adjuster 61 is calculated in the subtracter 61a. In the integrator 61b, a signal proportional to the value obtained by performing time integration of the difference between the oscillation amplitude data and the predetermined amplitude value is generated as the direct-current voltage component Vdc of the drive signal. The direct-current voltage component Vdc of the drive signal is generated to increase the potential between the drive electrode 13 and the electrode 26 of drive frame 11 when the oscillation amplitude data is smaller than the predetermined amplitude value. On the other hand, the direct-current voltage component Vdc of the drive signal is generated to decrease the potential between the drive electrode 13 and the electrode 26 of the drive frame 11 when the oscillation amplitude data is larger than the predetermined amplitude value (decremental adjustment). Accordingly, the amplitude driving force of the drive frame 11 and the detecting frame 12 is controlled to maintain the constancy of the oscillation amplitude of the drive frame 11 and the detecting frame 12 in the X-direction.

When the direct current Vdc of the drive signal is generated, the following effect can be obtained. Highly accurate control of the drive frame 11 and the detecting frame 12 can be obtained to minimize the difference between the oscillation amplitude data and the predetermined amplitude value of the drive frame 11 and the detecting frame 12 to almost zero.

Figure 6:
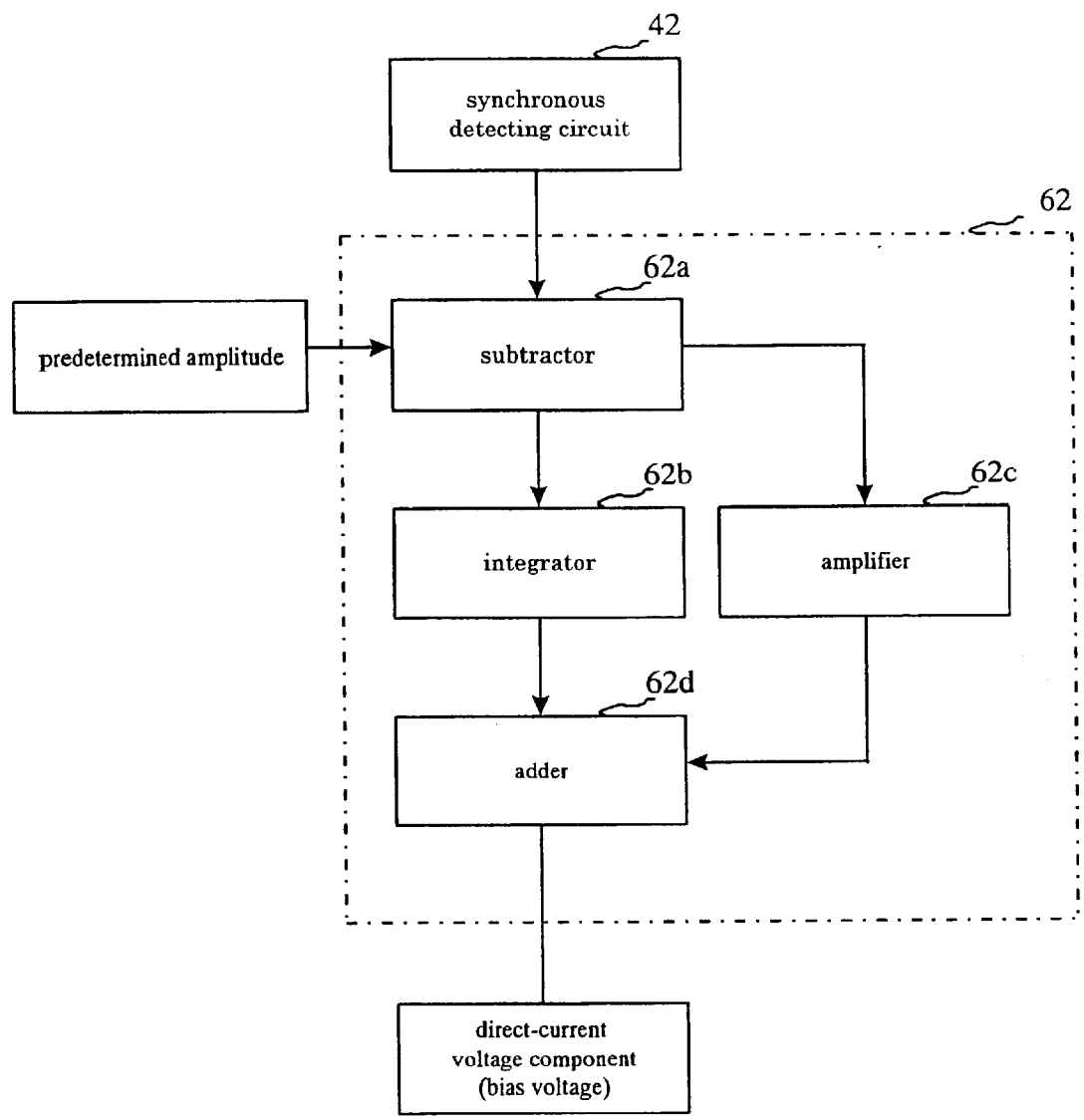
FIG. 6 is a schematic illustration of an example of still another amplitude adjuster of the first embodiment.

Further, the increase and the decrease of the direct-current voltage component Vdc of the drive signal can be controlled to be proportional to the difference between the deleted oscillation amplitude and the predetermined amplitude value or is controlled to be proportioned to the addition of the value obtained by performing time integration of the difference between the oscillation amplitude data and the predetermined amplitude value of the drive frame 11 and the detecting frame 12 detected based on the displacement signal. That is, in place of the amplitude adjuster 43 including the subtracter 43a and the integrator 43b, an amplitude adjuster 62 including a subtracter 62a, an integrator 62b, an amplifier 62c, and an adder 62d is adopted as shown in FIG. 6. In this case, the differences between the oscillation amplitude data and the predetermined oscillation amplitude data outputted to the amplitude adjuster 62 is calculated in the subtracter 62a. A signal proportional to the time integration of the difference between the oscillation amplitude data and the predetermined amplitude value is outputted to the adder 62d via the integrator 62b. A signal proportional to the difference between the oscillation amplitude data and the predetermined amplitude value is outputted to the adder 62d via the amplifier 62c. The addition of both signals via the integrator 62b and the amplifier 62c mixed in the adder 62d generates the direct-current voltage component Vdc of the drive signal. The direct-current voltage component Vdc of the drive signal is generated to increase the potential between the drive electrode 13 and the electrode 26 of drive frame 11 when the oscillation amplitude data is smaller than the predetermined amplitude value (incremental adjustment). On the other hand, the direct-current voltage component Vdc of the drive signal is generated to decrease the potential between the drive electrode 13 and the electrode 26 of drive frame 11 when the oscillation amplitude data is larger than the predetermined amplitude value (decremental adjustment). Accordingly, the amplitude driving force of the drive frame 11 and the detecting frame 12 is controlled to maintain the constancy of the oscillation amplitude of the drive frame 11 and the detecting frame 12 in the X-direction.

When the direct-current voltage component of the drive signal is generated in the forgoing manner, the lag for controlling the oscillation driving force of the drive frame 11 and the detecting frame 12 can be minimized. A control with high accuracy and good response for the drive frame 11 and the detecting frame 12 can be obtained to minimize the difference between the oscillation amplitude data and the predetermined amplitude value of the drive frame 11 and the detecting frame 12.

Second Embodiment

Figure 7:
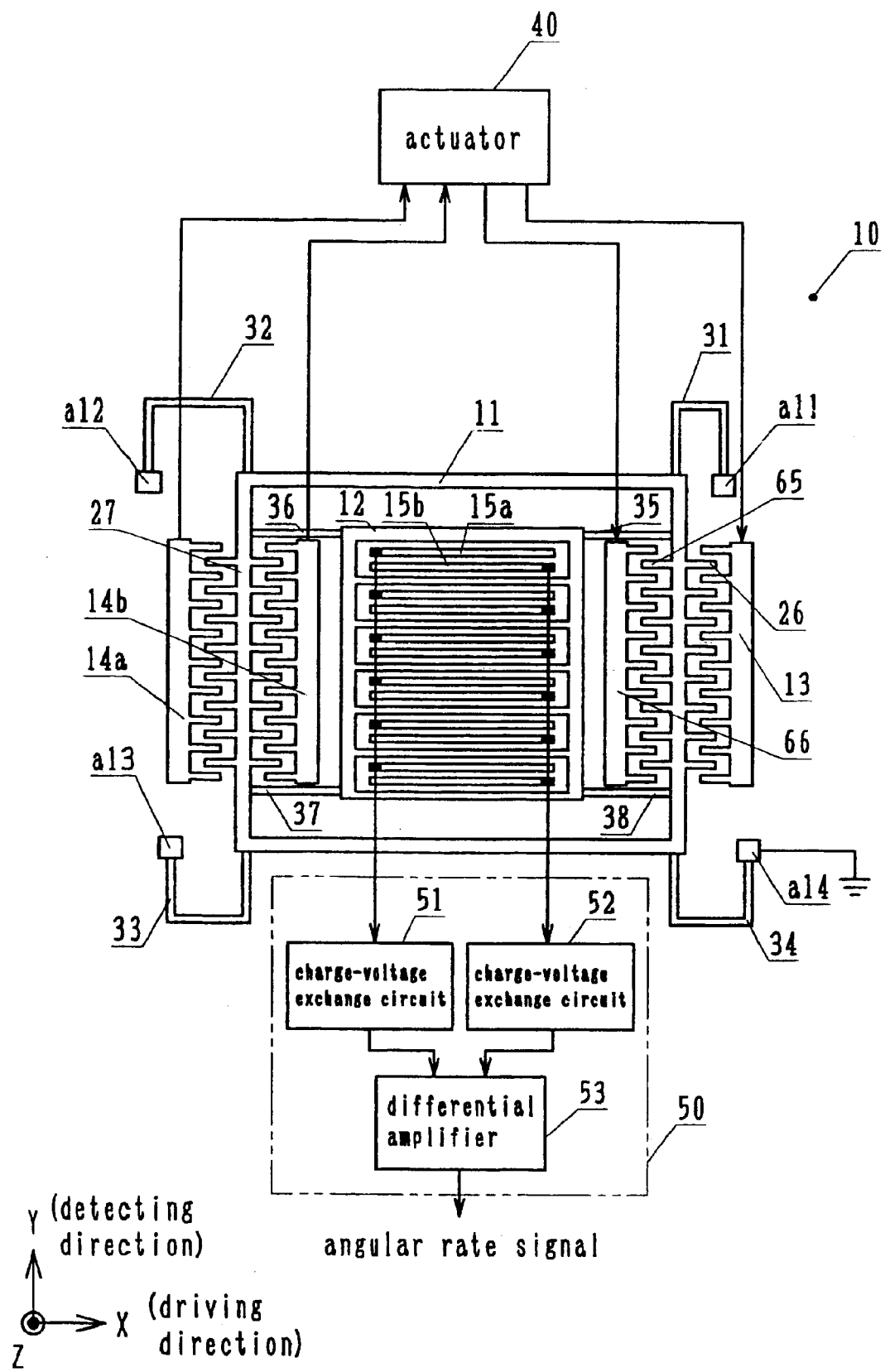
FIG. 7 is a schematic view showing an angular rate sensor according to a second embodiment of the present invention.
Figure 8A:
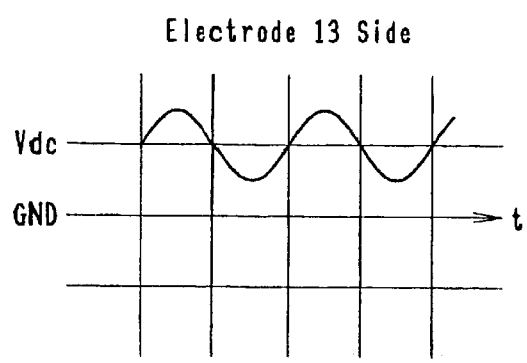
FIGS. 8a and 8b are time charts showing drive signals supplied to each drive electrode of the second embodiment.
Figure 8B:
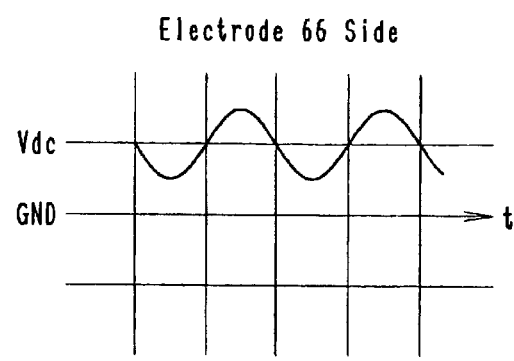
Figure 9:
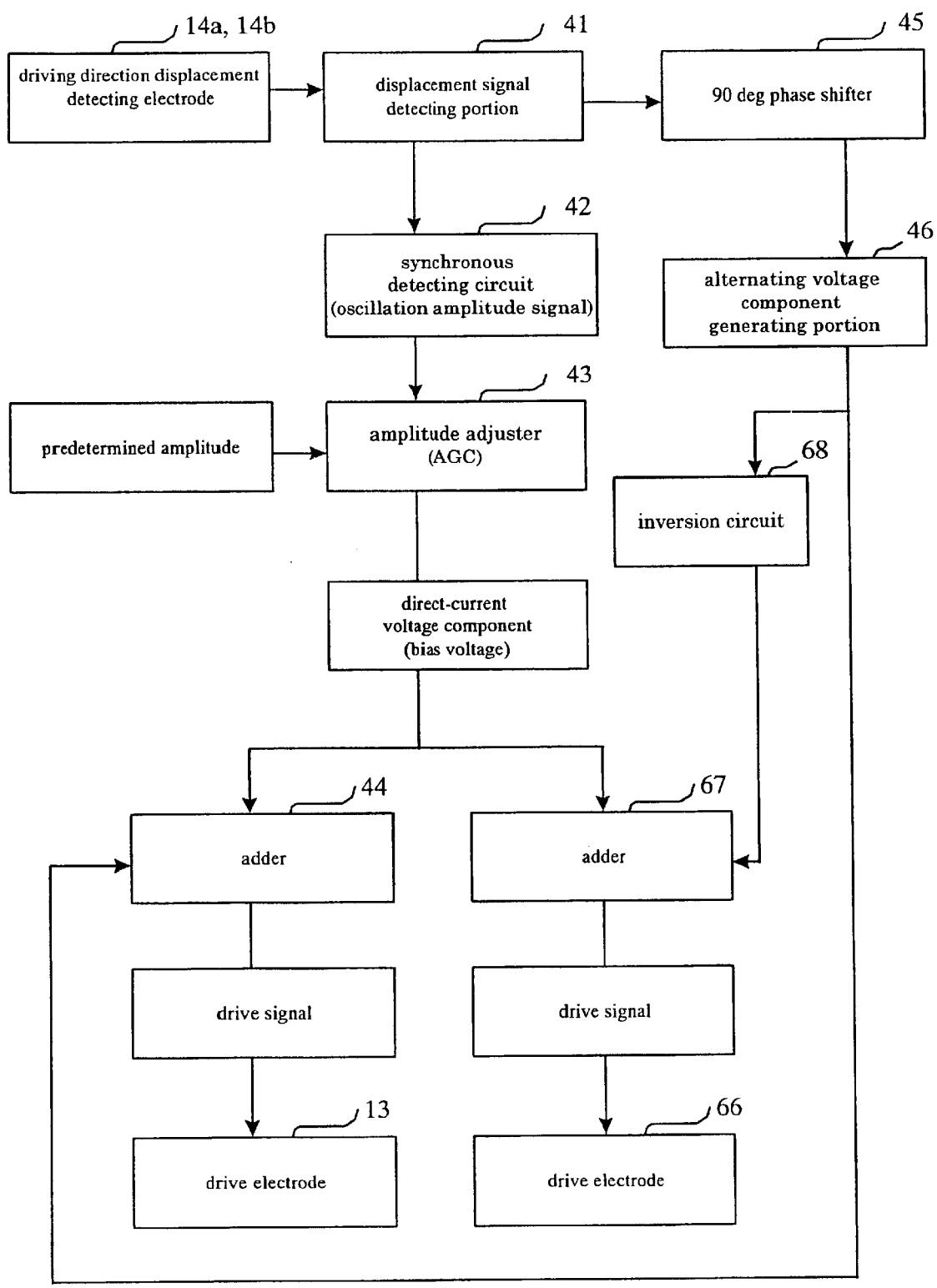
FIG. 9 is a schematic illustration of the angular rate sensor of the second embodiment.

An angular rate sensor applied in accordance with a second embodiment of the present invention of the actuator for an oscillator will be explained as follows referring to FIGS. 7 through 9. Referring initially to FIG. 7, which illustrates the actuator for an oscillator of the second embodiment, another drive electrode operated as a second drive electrode is included in addition to the electrode 13 of the first embodiment. Since the other components are the same as described in the first embodiment, a detailed explanation thereof are omitted from the description. One of the amplitude adjusters 61, 62 can be adopted in place of the amplitude adjuster 43.

As shown in FIG. 7, a second electrode 66 is formed with tines projecting in an interdigitated manner with the tines on the drive frame 11 which constitute an electrode 65 provided inside the drive frame 11 approximately along the Y-direction. The second drive electrode 66 is adhered to the silicon substrate 10 formed with insulation on the surface thereof as is the first electrode 13. The electrostatic attraction generated between the first and the second drives 13, 66 and the drive side movable electrodes 26, 65 is periodically fluctuated by supplying each drive signal from the actuator 40 to oscillate the drive frame 11 and the detecting frame 12 in the X-direction. Each drive signal consists of the direct current Vdc functioning as a bias voltage and the alternating voltage component of the first electrode 13 and of the second electrode 66 are inverted relative to each other as shown in FIGS. 8a and 8b.

The actuator 40 of the second embodiment has a structure for generating each drive signal outputted to the drive electrodes 13, 66. As shown in FIG. 9, the actuator 40 includes another adder 67 connected to the amplitude adjuster 43 and an inversion circuit 68 connected to the alternating voltage component generating portion 46. In the adder 67, the direct-current voltage component Vdc of the drive signal and the alternating voltage component of the inverted drive signal having a constant amplitude are added to generate an incorporated drive signal. The incorporated drive signal with the inverted alternating voltage component is supplied to the drive electrode 66.

As described above, according to the second embodiment of the present invention, the following effects can be obtained.

The drive frame 11 and the detecting frame 12 are oscillated by respective drive signals whose alternating voltage components supplied to the drive electrodes 13, 66 are alternately inverted relative to each other. The directions of the electrostatic attraction generated between the electrodes 26, 65 of the drive frame 11 and the drive electrodes 13, 66 are opposed to each other. In this case, the noise mixed in the displacement signal deriving from the alternating voltage component of each drive signal supplied to the drive electrodes 13, 66 is almost offset to reduce the total noise in the displacement signal.

Since the drive electrodes 13, 66 have approximately symmetrical structures having the same electrostatic attraction generated between the electrodes 26, 65 of the drive frame 11 and the drive electrodes 13, 66 by respective drive signals having the alternating voltage component inverted relative to each other, the component of the force generated proportional to the second power of the direct-current voltage component and the component of the force generated proportional to the second power of the alternating voltage component in the oscillation driving force supplied to the drive frame 11 and the detecting frame 12 are offset to reduce unnecessary motion.

Third Embodiment

Figure 10:
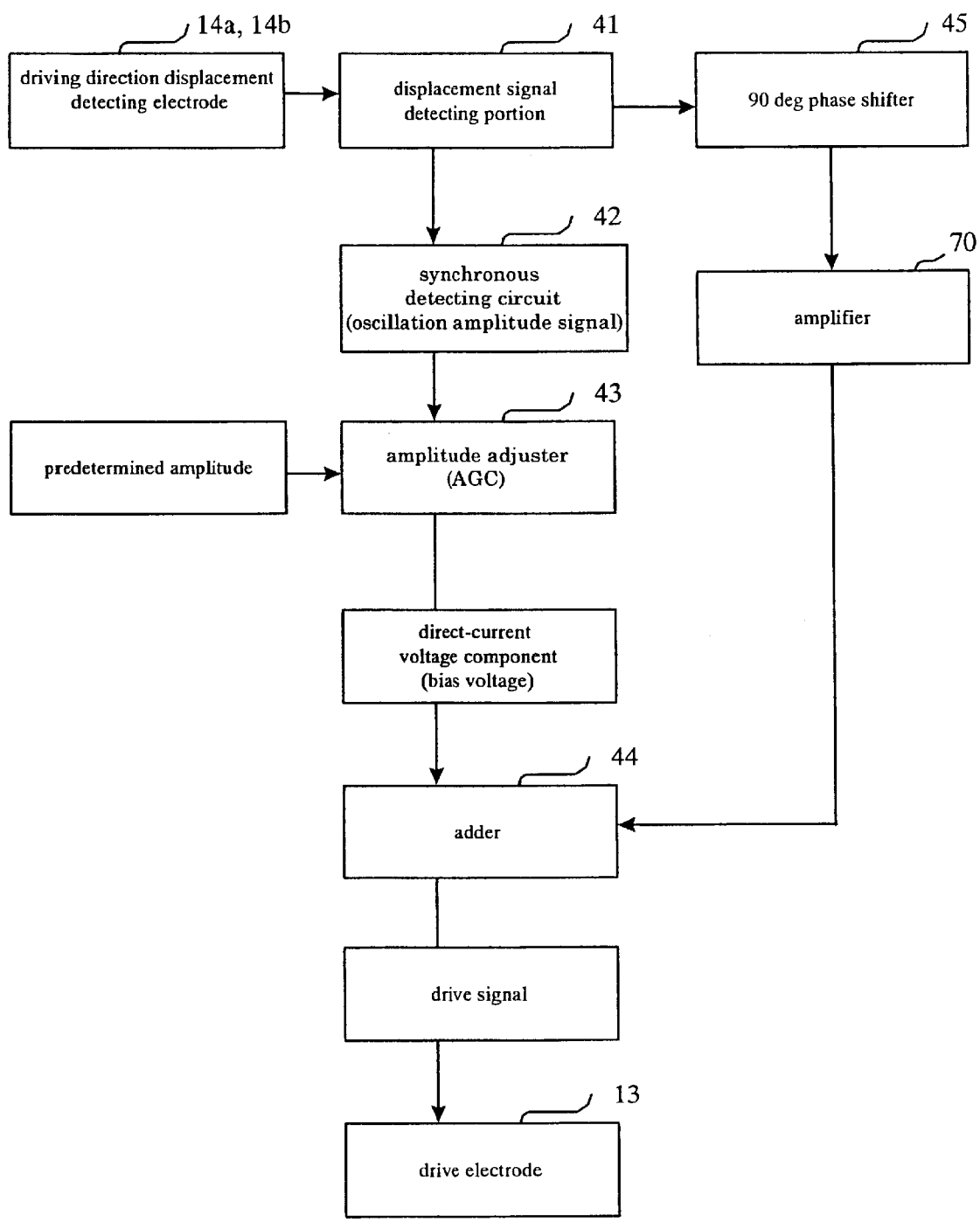
FIG. 10 is a schematic illustration of a third embodiment of the present invention.

An angular rate sensor according to a third embodiment of the present invention of the actuator for an oscillator will be explained referring to FIG. 10. The angular rate sensor applied with the actuator for an oscillator of the third embodiment includes an amplifier 70 instead of the alternating voltage component generating portion 46 of the first embodiment. Since the other components are the same as described in the first embodiment, a detailed explanation thereof is omitted from the description. One of the amplitude adjusters 61, 62 can be adopted in place of the amplitude adjuster 43.

According to a third embodiment of the present invention, the alternating voltage component of the drive signal is generated by amplifying the displacement signal phase-shifted by approximately 90 degrees in the 90 degree phase shifter 45 via the amplifier 70. That is, when the amplitude of the drive frame 11 and the detecting frame 12 is kept stable, the alternating voltage component of the drive signal having the constant amplitude is generated only by amplifying the displacement detecting signal based on the oscillation of the drive frame 11 and the detecting frame 12. Accordingly, compared to the case generating the alternating voltage component separated by the alternating voltage component generating portion 46, the structure of the circuit is simplified when the alternating voltage component is generated using the amplifier 70. The loop gain of the amplifying ratio by the amplifier 70 is predetermined to be larger than one (1) for oscillating the drive frame 11 and the detecting frame 12 at resonant frequency.

According to a third embodiment of the present invention, the following effects can be obtained.

In a third embodiment of the present invention, the alternating voltage component of the drive signal having the constant amplitude can be generated only by amplifying the displacement signal based on the oscillation of the drive frame 11 and the detecting frame 12 when the oscillation of the drive frame 11 and the detecting frame 12 is kept stable. Accordingly, the structure of the circuit can be simplified compared to when the alternating voltage component of the drive signal is generated only in the alternating voltage component generating portion 46.

In a third embodiment of the present invention, the alternating voltage component of the drive signal is generated as a sine wave by amplifying the displacement detecting signal detected as a sine wave. Accordingly, the noise generation of the harmonic component mixed when the alternating voltage component of the drive signal is generated as the rectangular wave can be minimized.

Figure 11:
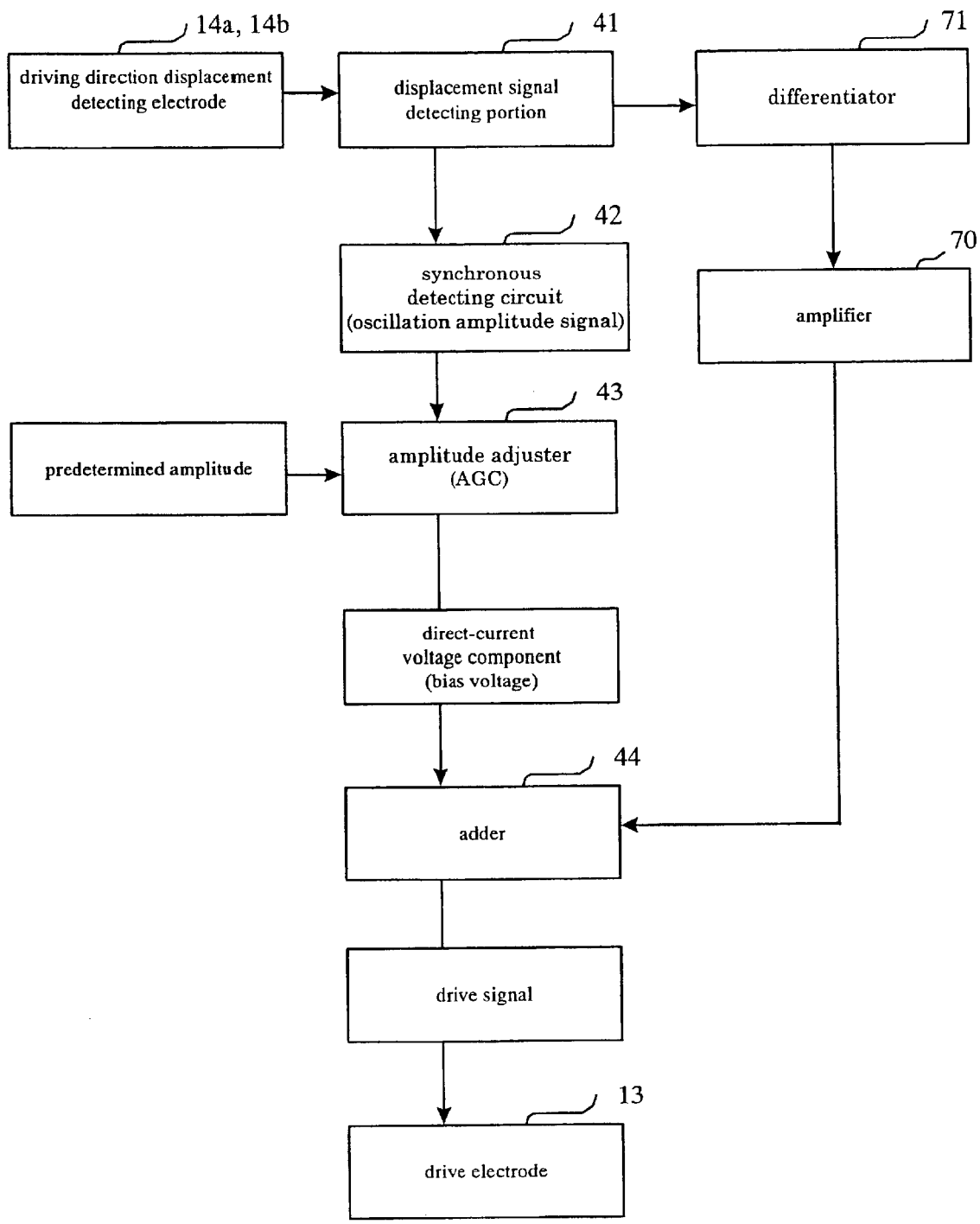
FIG. 11 is a schematic illustration of another example of the third embodiment.

As shown in FIG. 11, a differentiator 71 may be adopted in place of the 90 degree phase shifter 45 for phase-shifting the displacement detecting signal by approximately 90 degrees. By adopting the differentiator 71, the aforementioned effects of a third embodiment can be obtained.

Figure 12:
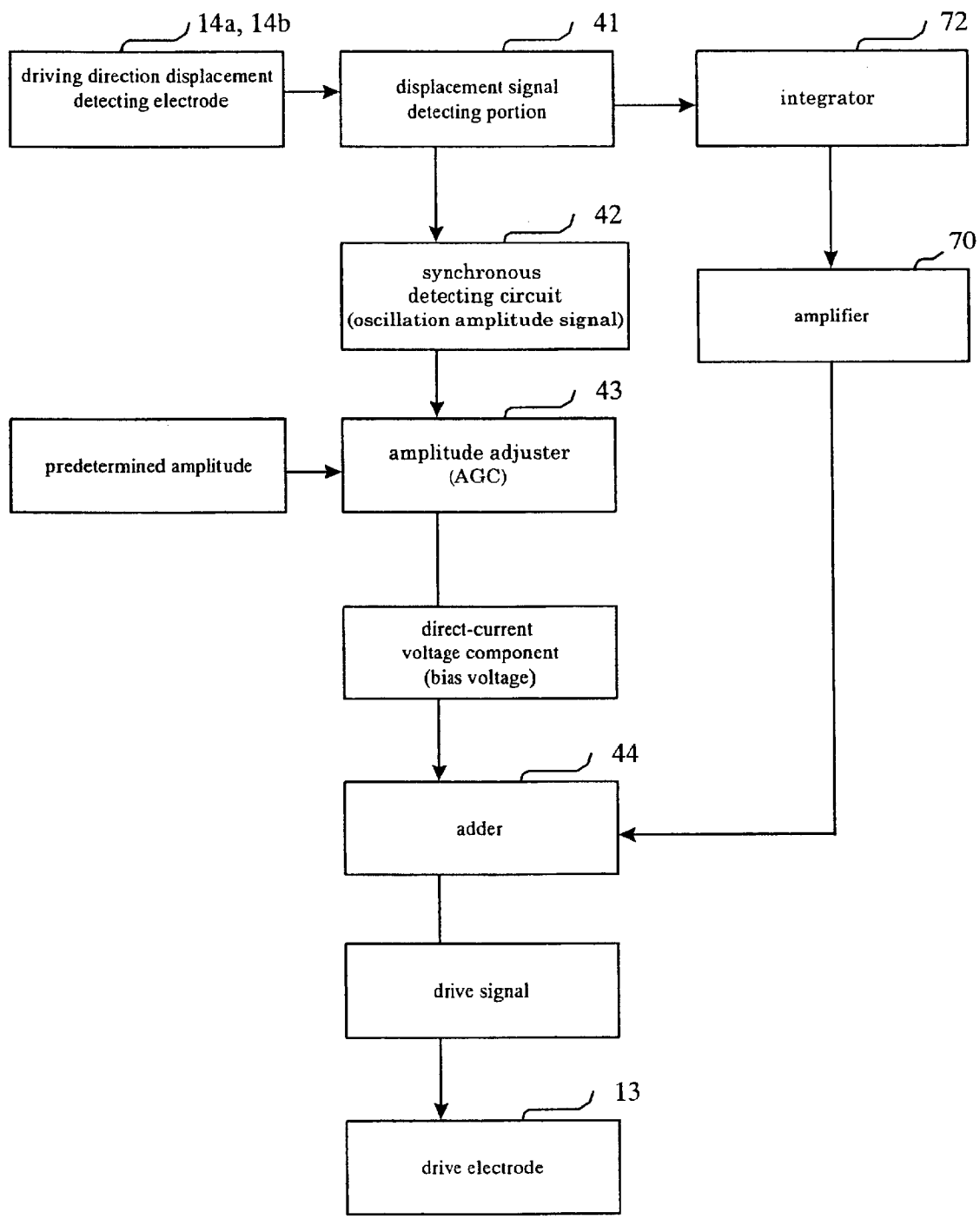
FIG. 12 is a schematic illustration of still another example of the third embodiment.

As shown in FIG. 12, an integrator 72 may be adopted in place of the 90 degree phase shifter 45 for phase-shifting the displacement detecting signal by approximately 90 degrees. The aforementioned effects of a third embodiment can be obtained by adopting the integrator 72.

Fourth Embodiment

Figure 13:
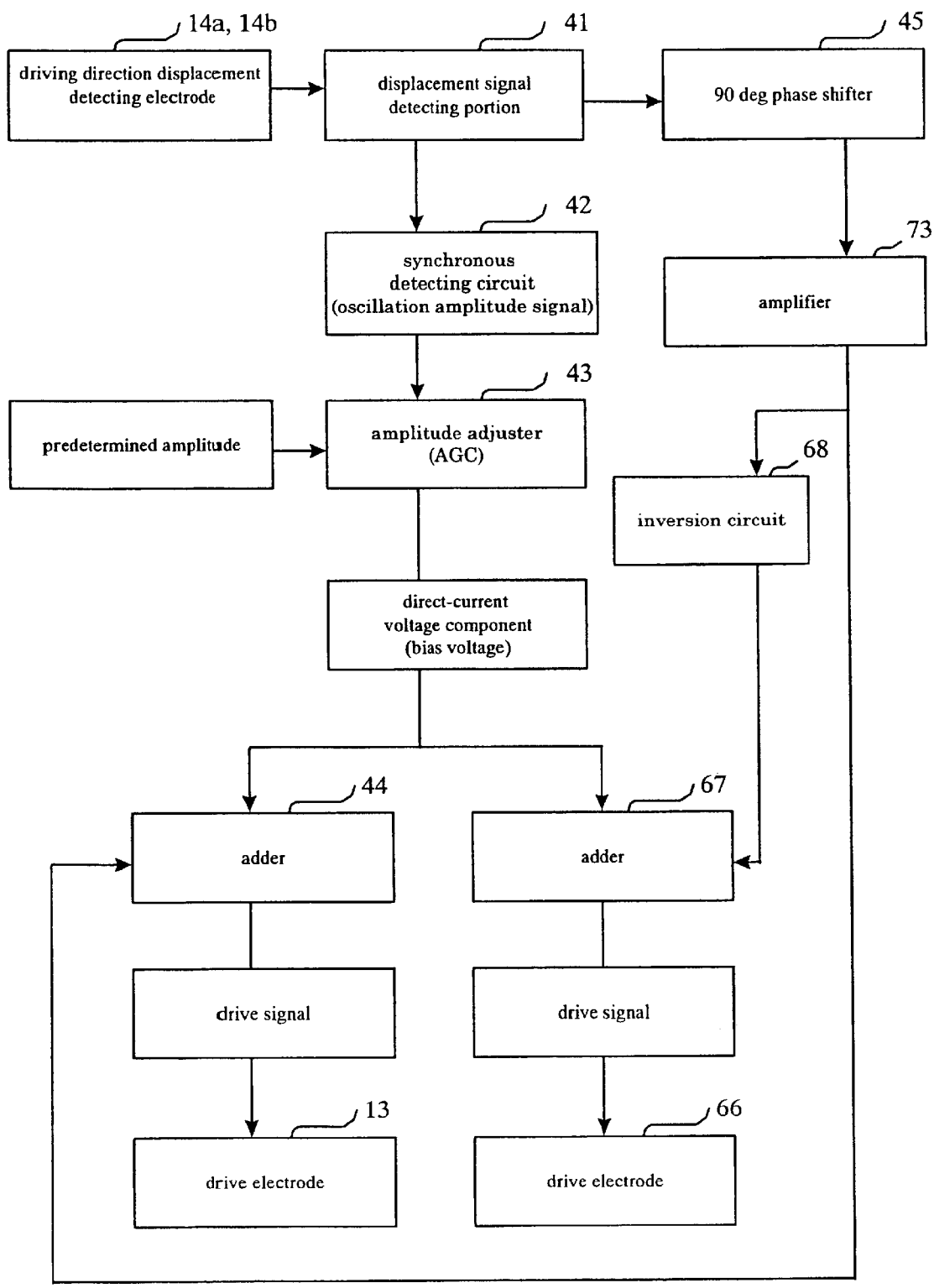
FIG. 13 is a schematic illustration of a fourth embodiment of the present invention.
Figure 14:
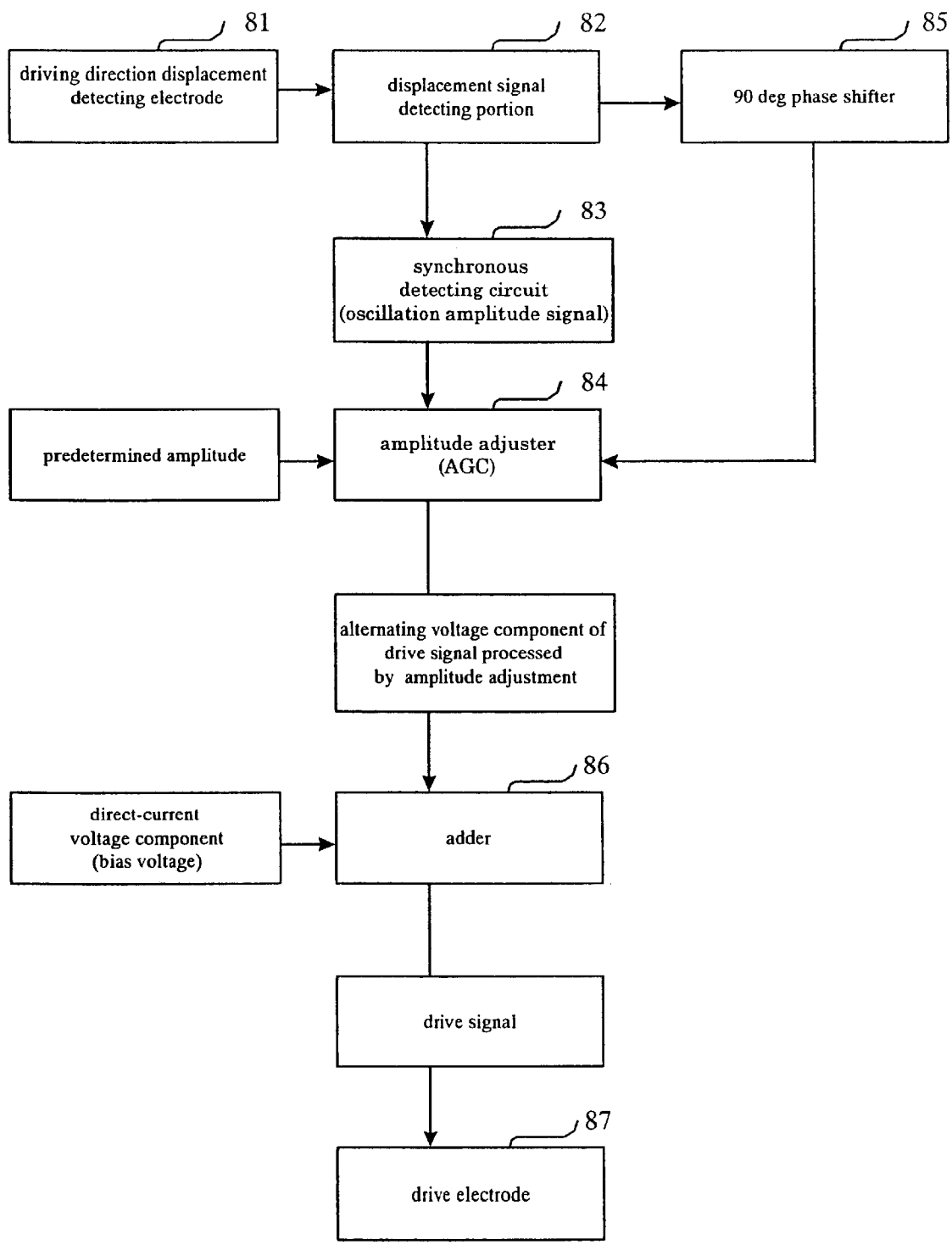
FIG. 14 is a schematic illustration of a conventional actuator for an oscillator.

An angular rate sensor according to a fourth embodiment of the actuator for an oscillator will be explained referring to FIG. 13. The angular rate sensor applied with the actuator for the oscillator according to a fourth embodiment includes an amplifier 73 in place of the alternating voltage component generating portion 46 of the second embodiment. Since the other components are the same as described in the first embodiment, the detailed explanation thereof are omitted from the description. One of the amplitude adjusters 61, 62 can be adopted in place of the amplitude adjuster 43.

The alternating voltage component of the drive signal is generated by amplifying the displacement detecting signal phase-shifted approximately by 90 degrees in the 90 degree phase shifter 45 via the amplifier 73 in the fourth embodiment. That is, the alternating voltage component of the drive signal having the constant amplitude is generated only by amplifying the displacement signal based on the oscillation of the drive frame 11 and the detecting frame 12 when the oscillation of the drive frame 11 and the detecting frame 12 is kept stable. In consequence, the structure of the circuit is simplified compared to the case when the alternating voltage component of the drive signal is generated separately by the alternating voltage component generating portion 46. The amplitude ratio of the amplifier 73 is also predetermined to have loop gain larger than one (1) for oscillating the drive frame 11 and the detecting frame 12 at resonant frequency.

According to the aforementioned fourth embodiment of the present invention, the same effects as the second and the third embodiment effects can be obtained.

It is to be understood that the present invention is not limited to the specific details of the embodiment described above. For example, the alternating voltage component of the drive signal of the first and the second embodiments can be either sine wave or rectangular wave.

Although the 90 degree phase shifter 46 is adopted in the first, second, and the fourth embodiments, a differentiator or an integrator may be adopted.

Although the phase shift is performed by approximately 90 degrees by the 90 degree phase shifter 45, the differentiator, or the integrator, the phase-shifting may be performed by any angle other than 90 degrees.

The oscillation detecting structure of the detecting frame 12 in the Y-direction adopted in the foregoing respective embodiments is one example and other structures may be adopted.

The structures of the angular rate sensor adopted in the foregoing respective embodiments are examples of the invention and their structures are not limited thereto.

The principles, preferred embodiments and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An actuator for an oscillator comprising:

an electrostatic driven oscillator;

an oscillator driving means for oscillating the electrostatic driven oscillator by outputting a drive signal thereto;

a displacement detecting means for detecting a displacement according to an oscillation of the electrostatic driven oscillator as a displacement signal; and an amplitude adjusting means for controlling the generation of the drive signal outputted from the oscillator driving means to maintain the constancy of an oscillation amplitude of the electrostatic driven oscillator based on the detected displacement signal;

wherein the amplitude adjusting means includes an alternating voltage component generating means for generating an alternating voltage component of the drive signal having a constant amplitude or an amplitude proportional to the oscillation amplitude and a direct-current voltage component generating means for generating a direct current component of the drive signal controlled to be increased or decreased based on the detected displacement signal; wherein an oscillation driving force of the electrostatic driven oscillator is controlled based on the drive signal including said alternating voltage component and the direct-current voltage component to maintain the constancy of the oscillation amplitude of the electrostatic driven oscillator.

2. The actuator for an oscillator according to claim 1, wherein increase or decrease of the direct-current voltage component of the drive signal is controlled to be proportional to a difference between the detected oscillation amplitude of the electrostatic driven oscillator based on the displacement signal and a predetermined amplitude or is controlled to be proportional to a value obtained by performing time integration of the difference between the detected oscillation amplitude of the electrostatic driven oscillator based on the displacement signal and the predetermined amplitude or is controlled to be proportional to an addition of the value obtained by performing time integration of the difference between the oscillation amplitude of the electrostatic driven oscillator detected based on the displacement signal and the predetermined amplitude and the value proportional to the difference between the oscillation amplitude and the predetermined amplitude.

3. The actuator for oscillator according to claim 1, wherein the alternating voltage component of the drive signal is generated having a phase contrast by approximately 90 degrees to the displacement signal and having an amplitude proportional to the amplitude of the displacement signal or is generated proportional to a signal obtained by differentiating, integrating or 90 degree phase-shifting the displacement signal.

4. The actuator for oscillator according to claim 1, further comprising:

first and second drive electrodes being driven by respective drive signals whose alternating voltage components are inverted relative to each other, so that the directions of the electrostatic attraction generated between the electrostatic driven oscillator and the first and second drive electrodes are opposed to each other.

* * * * *